June 19, 1956      J. VIGG      2,750,670
DENTAL MODEL
Filed Oct. 13, 1952      2 Sheets-Sheet 1
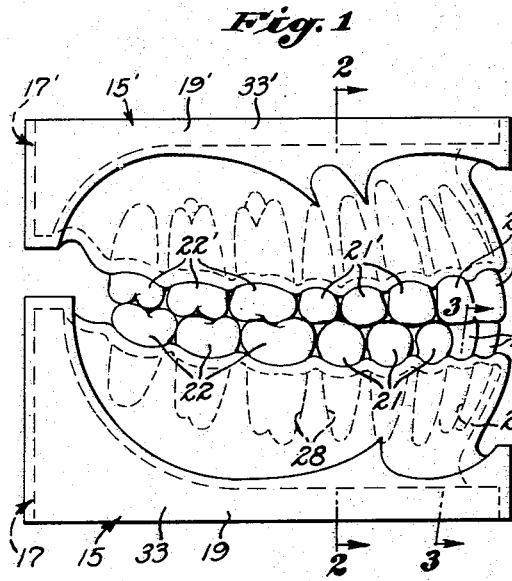
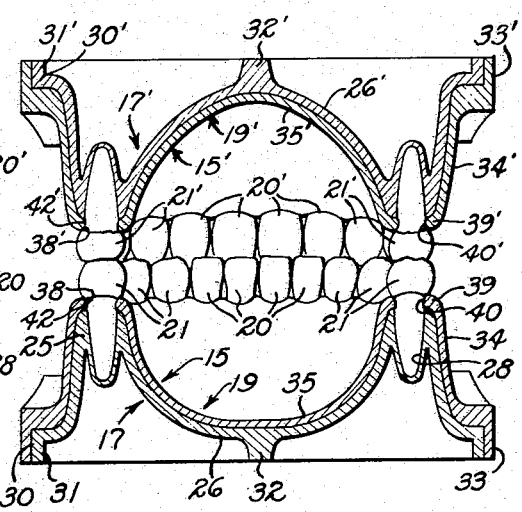
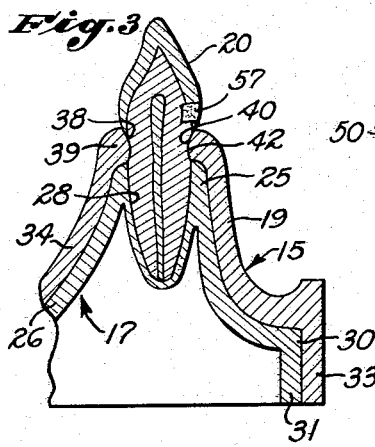
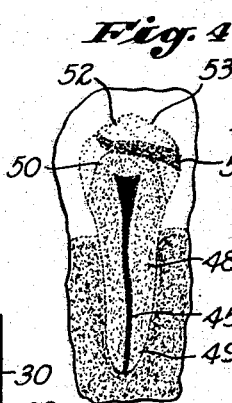
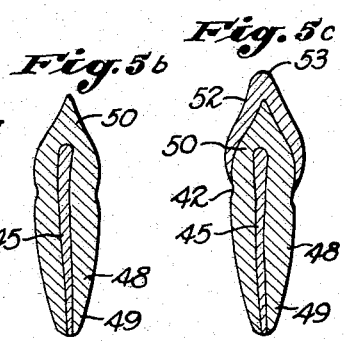
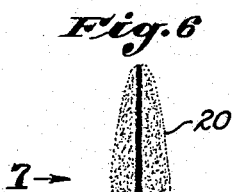
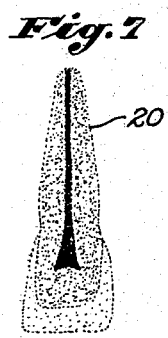
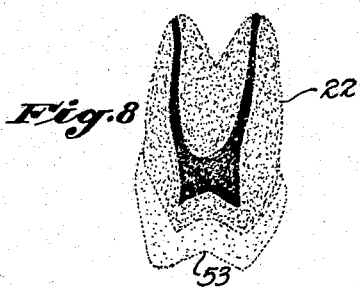
INVENTOR:
JOHN VIGG
BY HIS ATTORNEYS
HARRIS, KIECH, FOSTER & HARRIS June 19, 1956  J. VIGG  2,750,670
DENTAL MODEL
Filed Oct. 13, 1952  2 Sheets-Sheet 2
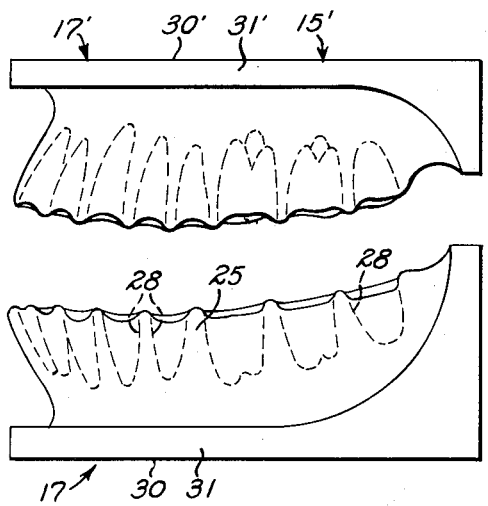
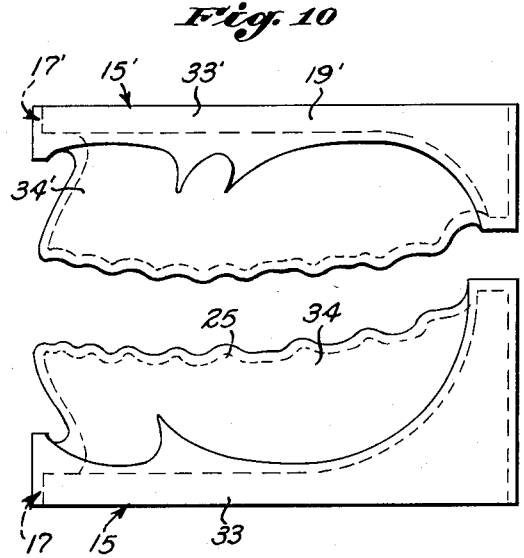
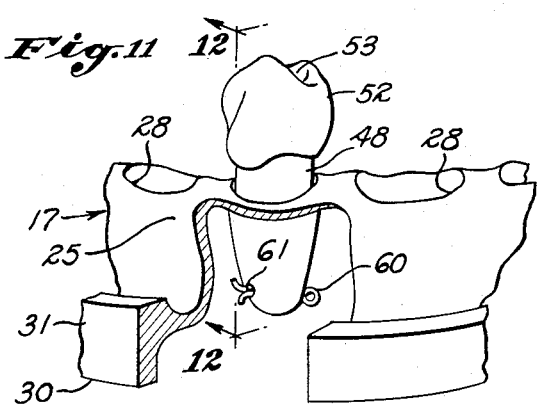
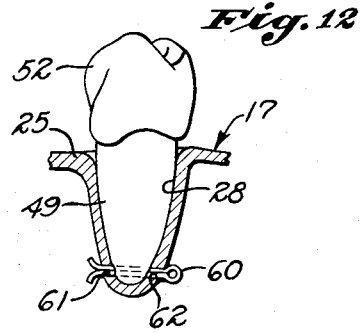
INVENTOR:
JOHN VIGG
BY HIS ATTORNEYS
HARRIS, KIECH, FOSTER & HARRIS

United States Patent Office 2,750,670
Patented June 19, 1956

2,750,670

DENTAL MODEL

John Vigg, Seattle, Wash.

Application October 13, 1952, Serial No. 314,475

18 Claims. (Cl. 32—71)

My invention relates to a dental model and a method of making same. More particularly, it relates to a novel tooth model alone and in novel relationship with a novel jaw-and-gum structure.

The intricacies of modern dental techniques make desirable for training and demonstration purposes the availability of accurate, likelike dental models. Heretofore, those commercially available have consisted of one or more jaw members to which model teeth were attached by pegs, the teeth being held rigidly in place by screws extending axially into the pegs through the jaw member. The teeth, while painted to simulate natural teeth, have been no more than rough approximations of their counterparts and have given the dental student little opportunity of learning correctly about dental anatomy and techniques through physical operations performed by dental instruments on the teeth or jaw members.

The present invention has, among its important features, the concept of more accurately disseminating information concerning dental anatomy and techniques by producing dental models that are truly lifelike in external appearance and internal structure. It is an object of the invention to produce such models and also to formulate tooth-simulating and jaw-simulating models which can be operated on by the student or demonstrator to uncover features of dental anatomy exactly as in the human mouth.

In this connection, it is an object of the invention to provide a multi-element tooth model accurately simulating in its elements the color, texture, hardness and drilling qualities, of corresponding elements of an actual tooth. A related object is to provide such a tooth model made of plastic materials, preferably with its elements molded and adhered by the molding operations performed. A further object is to provide a tooth model accurately shaped to conform to a natural tooth, not only in its crown portion but in its root structure, the latter consisting of one, two or three roots duplicating corresponding natural teeth. A further object is to provide a tooth model having therein a foreign element simulating a typical decay in a natural tooth and which can be drilled and filled as can its counterpart.

Existing dental models provide jaw members which are far from likelike. Gums are suggested by the simple but unsatisfactory expedient of applying a surface color to the material of the jaw member. It is an object of the present invention to provide a jaw-and-gum structure of a dental model which accurately simulates that found in a typical mouth and having accurately formed root sockets spaced and shaped as in nature and adapted to receive and conform to the root structures of the teeth models. It is an object to shape these root sockets to removably receive such root structures.

The jaw-and-gum structure of the invention preferably includes a jaw member providing the aforesaid root sockets and covered by a light-fitting sheath, both the jaw member and sheath being preferably formed of plastic material. It is an object of the invention to provide a dental model including such a jaw member and a gum-simulating sheath and, in the preferred embodiment, to make the sheath of elastic or semi-elastic material to be removably attached to the jaw member.

A further object is to hold the teeth with their root structures retained in their respective root sockets through co-action with such a gum-simulating sheath. In this connection, it is an object to provide an orifice in the sheath overlying each root socket and through which the root structure of the tooth can be inserted. A further object is to size the orifice to grip its contained tooth, thus connecting the tooth to the jaw member through the medium of a third or gum-simulating member. Still another object is to provide a tooth-gripping lip adjacent or bounding such an orifice and to provide a tooth model with a surface indentation receiving such a lip to assist in holding the tooth model in position.

Another important concept of the invention is the desirability of dental models which duplicate normal dental elements in both visual and X-ray appearance. It would be of great value to dental students to be able to take X-ray photographs of teeth or complete dental models to learn X-ray appearances of normal and defective teeth both before and after dental operations have been performed. It is an object of the invention to provide dental models accurately simulating their natural counterparts in X-ray appearance. A further object is to use novel means for rendering different sections of a dental model of different X-ray opacity by incorporation of radio-opaque material therein.

Further objects and advantages of the invention will be evident to those skilled in the art from the herein-contained description of exemplary embodiments.

Referring to the drawings:

Fig. 1 is a side elevational view of complete maxillary and mandibular dental models of the invention shown in normally mating relationship;

Fig. 2 is a cross-sectional view taken along the line 2—2 of Fig. 1;

Fig. 3 is a sectional view taken along the line 3—3 of Fig. 1 showing the structure adjacent a typical anterior tooth of the model;

Fig. 4 is a fragmentary view shaded to simulate the appearance of an X-ray photograph of a typical tooth model and adjacent bone structure (except for background density omitted here and in other X-ray simulating views), the tooth model having a simulated decayed portion in a typical location;

Figs. 5a, 5b and 5c are sequence views, in section, illustrating successive steps in the making of a tooth model of the invention;

Fig. 6 is a view of a typical anterior tooth model shade to simulate its appearance on an X-ray film except for background density;

Fig. 7 is a similar view taken in the direction of arrow 7 of Fig. 6;

Fig. 8 is a similar view of a typical molar model;

Fig. 9 is a side elevational view of the maxillary and mandibular jaw members of the invention;

Fig. 10 is similar to Fig. 9 but shows the jaw members when covered respectively by gum-simulating sheaths;

Fig. 11 is a fragmentary perspective view, partially broken away, showing an additional anchoring means for anchoring the tooth in the jaw member; and Fig. 12 is a sectional view taken along the line 12—12 of Fig. 11.

Referring particularly to Figs. 1, 2, 3 and 9, the invention is illustrated as comprising mandibular and maxillary jaw-and-gum structures 15 and 15', preferably of composite structure to include jaw members 17 and 17' respectively covered by gum-simulating sheaths 19 and 19'. Generally speaking, the mandibular structure provides removable tooth models or artificial teeth, hereinafter referred to merely as teeth, comprising anterior teeth 20, bicuspid teeth 21 and molars 22. The maxillary structure 15' provides similar teeth indicated by primed numbers.

The jaw member 17 provides a dental-arch upstanding shoulder 25, simulating the alveoli, bridged by a base member 26. This jaw member is formed of a relatively hard molded plastic material simulating in visual appearance and X-ray opacity corresponding portions of the mandibular jaw and particularly the bony structure thereof. It is molded in a multi-piece mold from plastic incorporating a small proportion of a radio-opaque material, as will be described. The plastic may be of the thermoplastic or thermosetting type, a thermosetting plastic such as one of the phenol formaldehyde resins being preferred.

Molded in the shoulder 25 of the jaw member 17 are root sockets 28 accurately shaped with one, two or three base pockets to correspond with the roots of natural teeth and spaced correspondingly along the dental-arch shoulder 25. The jaw member 17 is molded to provide a peripheral base 30 including an upright flange 31 which is preferably rectangular but which can be made to conform to the shape of the dental arch if desired. A longitudinal reinforcing web 32 is also preferably provided near the center of the base member 26 and may assist the flange 31 in forming a solid support for the model when resting on a table top.

The jaw member 17' is molded similarly and with similar elements, indicated by primed numerals, to simulate visually and in X-ray opacity the corresponding portions of a normal maxillary jaw. Each jaw member provides exposed surfaces accurately conforming in shape to the bony structure of the human mouth surrounding the tongue region and outwardly to a position outside the dental arch.

The gum-simulating sheaths 19 and 19' are relatively thin members preferably molded of elastic material in such shape as to provide inner surfaces accurately conforming to the aforesaid exposed surfaces of the respective jaw members and to provide outer surfaces accurately conforming in shape to the gum surfaces of the human mouth. The sheath 19 provides a peripheral portion 33 which preferably covers and resiliently grips the peripheral base of the jaw member 15. Likewise, this sheath provides a channel portion 34 receiving and gripping the upstanding shoulder 25, there being a bridge portion 35 extending in covering and contacting relationship with the arched base member 26. The sheath 19' provides corresponding portions 33', 34' and 35' similarly formed with respect to the jaw member 15'. Each sheath is, in the preferred embodiment, held taut against its jaw member by internal stresses in the elastic material of which the former is formed, being peelable therefrom starting at any peripheral edge. Less desirably, the sheath may be adhered to or made integral with its jaw member but should be soft relative to the material of the latter.

The thickness of each sheath in its various portions may be substantially uniform but preferably varies to conform to localized differences in thickness of gum tissues and mouth membranes in a normal mouth. This is particularly desirable both to teach dental anatomy and when fitting artificial dentures, permitting the sheath to deform as would the tissues in the human mouth. Each sheath is preferably formed of a pink plastic material substantially free of radio-opaque material so as to be substantially completely transparent to X-rays. An elastic plastic material such as a thermoplastic or thermosetting resin will be satisfactory. A thermosetting flexible plastic such as a polyvinyl resin, will be found very desirable but any other resilient or elastic plastic or natural or synthetic rubber will be found quite satisfactory.

Each sheath is molded to provide an orifice 38 or 38' directly overlying each root socket 28 or 28' and registering with the mouth of the latter. The size of each orifice is preferably such as to grip resiliently its contained tooth to removably hold the root structure of such tooth in its respective root socket. To aid this gripping and holding action, each orifice may be bounded by a circular lip 39 or 39' having a convex surface 40 or 40' at opposed positions or completely around the orifice, see particularly Figs. 2 and 3.

Such a lip or its convex surfaced portion preferably is positioned to fit into a surface depression 42 or 42' of the tooth, forming a detent means for holding the tooth in place. The surface depression is molded in the tooth either in substantial conformity to the minute depression found on certain of the natural teeth at the base of the enamel, or the surface depression may be molded in one side, opposed sides, or completely around the tooth as a minute deviation from natural tooth structure. Even an extremely shallow and hardly noticeable surface depression will removably anchor the tooth in a lifelike manner, permitting it to be rocked or laterally shifted in a small degree, determined by the small clearance between the root structure and the root socket, and permitting it to be removed individually from its root socket by being gripped between the thumb and index finger or by a forceps.

Irrespective of any other anchoring means that may be used, it is desirable that the lip 39 or 39' should snugly engage the tooth both for holding purposes and to simulate the relative closeness of normal gum tissue to the adjacent tooth. In this latter connection, it will be observed that the lip can be retracted from the tooth by a dental instrument, as in the mouth. In addition, the sheath can be cut to expose the tooth, as in a natural oral cavity, and can be stitched together with a suture or adhered by a suitable adhesive or by placing a small portion of the monomer of the plastic material on the suture or the edges to unite these edges.

The structure and the method of making a typical model tooth are best illustrated in Figs. 5a, 5b and 5c. The preferred sequence is first to mold a pulp-simulating member 45 in a suitable mold having a molding cavity shaped to conform to the pulp cavity of the particular tooth being simulated, except being longer so that the member has an extra end portion 46, indicated by dotted lines. To simulate the vascular pulp and nerve of the natural tooth, the member 45 is molded of a plastic material of pinkish color simulating the pulp of a natural tooth. Preferably, the plastic material is resilient or elastic, permitting it subsequently to be withdrawn from the tooth model, but it can be made of a relatively hard plastic material. The softer plastic material may be of the thermoplastic or thermosetting type, such as a polyvinyl flexible material, or a vulcanized flexible rubber. The plastic material should be substantially free of radio-opaque material so as to be freely transmissive of X-rays to appear very dark in an X-ray photograph. In molding the pulp-simulating members for the various teeth, the number of pulp branches and the shape of the nerve cavity joining them will vary with normal physiology, Figs. 6, 7 and 8 showing typical forms.

The pulp-simulating member 45 is then suspended by its end portion 46 in a molding cavity of another mold, shaped to correspond to the dentine of the tooth being simulated. This mold is then filled with plastic material, producing a dentine-simulating member 48 having a naturally appearing root structure 49 and crown 50 with the surface indentation 42 near the junction thereof. The root structure 49 will have one, two or three roots to correspond to the natural tooth being simulated and differs therefrom only in omitting the paradental membrane which normally surrounds the root and holds it in the jaw socket. The molded plastic material surrounds the correctly placed pulp-simulating member 45 and adheres thereto to an extent controlled by the materials used and the molding operation performed. It is usually preferable to avoid substantial adherence so that the pulp-simulating member 45 can be removed as a unit when exposed by drilling or removing the crown, to duplicate the removability of natural tooth pulp.

The dentine-simulating member 48 is preferably formed of a relatively hard thermoplastic or thermosetting plastic material, e. g., a thermosetting phenol formaldehyde resin. A material of the melamine formaldehyde type will be found well suited. The material used is preferably of an off-white color to simulate the appearance of natural dentine and preferably contains a small proportion of radio-opaque material to make its photographed X-ray appearance lighter than the pulp-simulating member but darker than the enamel-simulating cap to be described. The end portion 46 can be removed after the dentine-simulating member is molded.

The resulting structure, illustrated in Fig. 5b, is then supported in a molding cavity of another mold to which the crown 50 is exposed and which is shaped to correspond to the enamel of the tooth being simulated. This mold is then filled with plastic material, producing an enamel-simulating cap 52 adhering to the dentine-simulating member 48 and shaped in its exterior and in its grinding surface 53 to correspond to the natural tooth. The enamel-simulating cap 52 surrounds the crown 50 and extends to a position just below the point of initial contact with the lip 39 of the gum-simulating member. The surface indentation 42 is usually at the base of the cap 52.

The enamel-simulating cap 52 is formed of a relatively hard plastic material and may be of the same type as that forming the dentine-simulating member, mentioned above. It differs, however, in being of whiter color and in containing a larger proportion of radio-opaque material.

For demonstration, study or operative purposes, there may be formed in certain model teeth, or in replacements therefor, decay-simulating portions positioned and shaped to be typical of commonly observed decay conditions. Such portions are designated in Figs. 3 and 4 by the numeral 57 and can represent cavities molded in the cap 52, in the dentine-simulating member 48, or both. Any such cavity can be filled or packed with a plastic material similar to that employed for the pulp-simulating member and will be substantially free of radio-opaque material to appear darker in an X-ray photograph. Such decay-simulating portions can be drilled out and the decay cavity cleaned as in operating on a natural tooth, this being done while the tooth model is a part of the complete dental model and thus simulating actual oral conditions.

The various elements of the invention can be controlled in X-ray opacity by incorporation of suitable amounts of radio-opaque material, by which I have reference to any material tending to impede the transmission of X-rays. This material should be distributed substantially uniformly throughout the plastic material. In the preferred practice, when starting with a plastic material in powder form, I mix a powdered radio-opaque material therewith before supplying the plastic material to the mold and before setting thereof by use of catalysts or heat. The preferred material is a finely powdered barium salt, e. g., barium sulphate, but other subdivided salts or metals having radio-opaque properties and compatible with the plastic material can be used.

By way of example, when employing powdered barium sulphate as the radio-opaque material, approximately the following weight ratios of this material to plastic material have been found to produce X-ray photographic images closely duplicating those obtainable from human subjects: In the dentine-simulating member 48, about 1:8 to 1:12, preferably about 1:10; in the enamel-simulating cap 52, about 1:4 to 1:8, preferably about 1:6; and in the jaw member 15 or 15', about 1:10 to 1:18, usually about 1:14. It will be understood, however, that these ratios will differ with different materials of the mixtures used and that if different radio-opaque materials are used in the different composite elements the relative ratios exemplified above may be different.

The appearance of typical model teeth on dental X-ray film is suggested in Figs. 4 and 6–8, inclusive. In addition, dental X-ray photographs of any tooth-containing portion of the complete mandibulary or maxillary models will substantially duplicate photographs of corresponding sections of the human mouth. This is of great value in permitting the dental student to check X-ray appearances before and after dental operations or manipulations.

Additionally, the composite models are closely duplicate of actual human dental structures in color, texture, workability and shape. Not only are the model teeth and supporting structure physiologically correct in appearance but also in their physical relationships. Thus, the root sockets are only sufficiently larger than the corresponding root structures received thereby to permit relatively free ingress and egress thereof with a limited amount of side play. This side play, in conjunction with the resiliency of the lip 39 or 39', permits each tooth to be shifted laterally a small distance in close simulation of a natural tooth which can be shifted slightly toward and away from an adjacent tooth upon sidewise pressure being applied. The natural gum simulation and jaw simulation of the model give accurate information as to the physical structure of their counterparts. Except as hereinafter described, there is no anchoring means obscuring the natural appearance, internally or externally, of the root structure, as in prior devices. Operations can be performed on a model tooth while in situ in the complete model, and dental techniques of cleaning, applying dams, etc., can be performed on the model as in the human mouth.

If it should be desired further to anchor any particular model tooth in its socket, this can be performed, without obliteration of important features, by the supplementary locking means shown in Figs. 11 and 12. Here, an anchoring pin 60, typically a cotter pin, may be inserted through aligned openings 61 and 62 in the socket-bounding walls of the jaw member 17. Rather than to extend the pin 60 diametrically through a root, it is preferable to displace it from the central axis of the root, as by aligning the openings 61 and 62 so that the pin 60 passes partially or entirely to one side of the pulp-simulating member 45. No such additional anchoring means is necessarily employed, each tooth being holdable in its socket by being gripped by the gum-simulating sheath. The supplementary anchoring means, however, can be used when one or more of the model teeth are to be more permanently connected to the jaw member.

While the invention has been exemplified as applied to complete models of the mandibular and maxillary jaws, its features are equally applicable to smaller sections thereof including one or more teeth. Additionally, the model teeth, accurate in X-ray appearance as well as visual appearance, can be employed in other types of dental models or can individually serve valuable functions in teaching or demonstrating dental anatomy and techniques.

Various changes can be made without departing from the spirit of the invention as defined in the appended claims.

I claim as my invention:

1. A dental model accurately simulating a jaw and tooth arrangement presenting the teeth in their natural form and relative arrangement, each tooth having a natural-form root structure, said dental model including: a jaw member having closed-bottom root sockets respectively shaped to receive said natural-form root structures of said teeth; and a gum-simulating sheath of elastic material removably covering said jaw member and detachably secured thereto independent of any coaction between said teeth and said jaw member, said sheath having separate orifices registering with and overlying said root sockets when said sheath is in place on said jaw member but extending openly through said sheath as openings when said sheath is removed from said jaw member, the root structure of each tooth being individually insertable into a corresponding root socket through its overlying orifice, each orifice being sized to resiliently grip its contained tooth when in place and hold it removably in natural position.

2. A dental model as defined in claim 1 in which said jaw member includes a peripheral flange, said sheath including an internal surface conforming to the external surface of said jaw member and held taut thereagainst and against said peripheral flange by internal stresses in said elastic material, said sheath being retained on said jaw member exclusively by the elasticity of said material of which said sheath is made.

3. A dental model as defined in claim 1 in which said jaw member includes a base having a peripheral zone, and in which said sheath covers and resiliently grips said peripheral zone.

4. A dental model as defined in claim 1 in which said jaw member includes a dental-arch upstanding shoulder in which said root sockets are formed, said shoulder being bridged by an arched base member, said sheath having a channel portion receiving said upstanding shoulder and providing a bridge portion extending in covering and contacting relationship with said arched base member, said sheath being peelable from and replaceable on said upstanding portion and said arch base member.

5. A dental model as defined in claim 1 including a locking member engaging and extending laterally of each tooth and extending through said jaw member at a position displaced from the closed bottom of the corresponding root socket.

6. A dental model including: an artificial tooth having a root structure and a crown, said crown providing an enamel-simulating cap, said artificial tooth providing a surface indentation adjacent the base of said cap; and a jaw-and-gum structure providing a root socket shaped to removably receive said root structure through a mouth of such socket, said jaw-and-gum structure providing a lip of elastic material overlying said mouth, said lip fitting into said surface indentation and forming a means for removably retaining said root structure of said tooth in said root socket.

7. A dental model including: an artificial tooth having a root structure and a crown, said crown providing an enamel-simulating cap, said artificial tooth providing a surface indentation adjacent the base of said cap; a jaw member comprising a dental-arch upstanding shoulder providing a root socket shaped to receive said root structure; and a sheath of elastic material gripping said jaw member and extending over said shoulder, said sheath having a lip-bounded orifice directly overlying said root socket, said lip fitting in said surface indentation and resiliently gripping said tooth to hold same with said root structure in said root socket.

8. A dental model as defined in claim 7 in which said surface indentation comprises shallow channels on opposed side portions of said tooth.

9. A dental model accurately simulating in appearance and X-ray opacity a jaw and tooth arrangement, said dental model including: a jaw member having root sockets, said jaw member being formed of a relatively hard plastic material containing a small proportion of a radio-opaque material in subdivided form; a gum-simulating sheath formed of a relatively soft elastic material, said sheath being substantially free of radio-opaque material; and a plurality of tooth models having root structures respectively extending removably into said root sockets, each tooth model comprising a dentine-simulating member formed of a relatively hard plastic material containing a small proportion of a radio-opaque material in subdivided form, said dentine-simulating member having a pulp cavity containing a substance offering substantially no impedance to X-ray transmission, each tooth model including a tool-enamel-simulating cap carried by such dentine-simulating member and formed of a relatively hard plastic material containing a larger proportion of radio-opaque material than the dentine-simulating member to which it is attached, said dental model being characterized by having such X-ray opacity in its various portions as to appear imagewise on an X-ray film substantially duplicative of the X-ray image of corresponding dental anatomy in the natural mouth.

10. A dental model of a tooth of X-ray opacity substantially duplicative of a natural tooth, said model comprising: a dentine-simulating member formed of a relatively hard plastic material containing a small proportion of a radio-opaque material that is substantially opaque to X-rays, said plastic material being an off-white color to simulate in appearance and X-ray opacity the dentine of a natural tooth, said member having a pulp cavity, said pulp cavity containing a simulated pulp formed of a material offering substantially no impedance to X-ray transmission to appear darker than said dentine-simulating member in an X-ray photograph, said member providing a root structure and a crown; and a tooth-enamel-simulating cap on said crown, said cap being formed of a plastic material harder and whiter than said dentine-simulating member and containing a larger proportion of radio-opaque material that is substantially opaque to X-rays to appear lighter than said dentine-simulating member in an X-ray photograph.

11. A dental model of a tooth as defined in claim 10 in which said pulp cavity contains a mass of plastic material substantially free of radio-opaque material to be transparent to X-rays and thus appear darker than said dentine-simulating member and said cap in an X-ray photograph.

12. A dental model as defined in claim 11 in which said plastic material of said mass is softer and more resilient than the plastic material of said cap and of said dentine-simulating member.

13. A dental model as defined in claim 10 in which each of said radio-opaque materials is a finely divided inorganic material of high X-ray opacity dispersed respectively throughout the plastic material of said cap and said dentine-simulating member.

14. A dental model as defined in claim 10 in which the radio-opaque material in said cap and in said dentine-simulating member is finely divided barium sulphate.

15. A dental model as defined in claim 10 in which the amount of radio-opaque material is in substantially the following ratios: in said dentine-simulating member about 1:8 to 1:12 by weight of radio-opaque material to plastic material; and in said cap about 1:4 to 1:8.

16. A dental model of a tooth of X-ray opacity substantially duplicative of a natural tooth, said model comprising: a molded pulp-simulating member formed of a soft plastic material substantially free of radio-opaque material; a dentine-simulating member molded around said pulp-simulating member, said dentine-simulating member being formed of a relatively hard plastic material with a subdivided radio-opaque material dispersed throughout, said dentine-simulating member providing a root structure and a crown; and an enamel-simulating cap molded around and adhering to said crown, said cap being formed of a plastic material harder than said relatively hard plastic material with a subdivided radio-opaque material dispersed throughout and in concentration exceeding the concentration in the plastic material of said dentine-simulating member.

17. A dental model of a tooth, said model comprising: a molded pulp-simulating member formed of a soft plastic material; a dentine-simulating member formed of a relatively hard plastic material molded around said pulp-simulating member, said dentine-simulating material including a root structure and a crown, said crown having a portion overlying and covering one end of said pulp-simulating member, the other end of said pulp-simulating member being exposed at an end portion of said root structure; and an enamel-simulating cap formed of a relatively hard plastic material molded around and adhering to said crown.

18. A method of making a dental model of a tooth, which method involves the successive use of a plurality of molds and which method includes the steps of: molding in one of said molds an elongated pulp-simulating member of relatively soft plastic material, said pulp-simulating member having an extra end portion; supporting the resulting elongated pulp-simulating member by said extra end portion in another of said molds, the remainder of said pulp-simulating member extending within the interior of said other mold free of support except from said extra end portion; filling said interior around said pulp-simulating member with a relatively hard-setting plastic material and hardening such material in such interior to form a dentine-simulating member shaped by said interior of said other mold, said dentine-simulating member having a root structure and a crown; removing the dentine-simulating member from said other mold and placing it in a further mold with an end portion of said crown exposed on all sides within said further mold; filling such further mold around said end portion with a relatively hard-setting plastic material to form an enamel-simulating cap surrounding and adhering to said crown; and removing said extra end portion from said pulp-simulating member.

References Cited in the file of this patent

UNITED STATES PATENTS

| | | |
|---|---|---|
| 1,045,920 | Wenker | Dec. 3, 1912 |
| 1,048,382 | Allen | Dec. 24, 1912 |
| 2,005,114 | Spitzer et al. | June 18, 1935 |
| 2,419,084 | Myerson et al. | Apr. 15, 1947 |
| 2,420,570 | Shapiro | May 13, 1947 |
| 2,473,515 | Egger | June 21, 1949 |
| 2,514,076 | Kelly | July 4, 1950 |

OTHER REFERENCES

"Plastics in Medical Teaching," British Plastics, December 1949 (pp. 634–639).